United States Patent [19]

Mori

[11] Patent Number: 5,720,693
[45] Date of Patent: Feb. 24, 1998

[54] ENGINE OUTPUT CONTROL APPARATUS

[75] Inventor: Kyosuke Mori, Fuji, Japan

[73] Assignee: Jatco Corporation, Fuji, Japan

[21] Appl. No.: 691,237

[22] Filed: Aug. 2, 1996

[30] Foreign Application Priority Data

Aug. 2, 1995 [JP] Japan ................................. 7-197385

[51] Int. Cl.$^6$ ................................. F02D 45/00; F02D 5/15
[52] U.S. Cl. ................................................. 477/107
[58] Field of Search ........................... 477/107, 109

[56] References Cited

U.S. PATENT DOCUMENTS 5,433,676 7/1995 Abe et al. ........................... 477/109
5,476,425 12/1995 Shiraishi et al. ..................... 477/109

FOREIGN PATENT DOCUMENTS 63-189658 8/1988 Japan.

*Primary Examiner*—Dirk Wright
*Attorney, Agent, or Firm*—Foley & Lardner

[57] ABSTRACT

An engine output control apparatus for an internal combustion engine includes a drive force transferring section interconnected with a crankshaft of the engine. The output of the engine is controlled at a desired value by an output control section. A transferred torque through the drive force transferring section is estimated by a torque estimating section. A torque suppressing section lowers the output of the engine so as to keep the estimated torque within a predetermined range by sending a signal to the output control section. A shift detecting section outputs a signal to a time delaying section when it detects a shifting from an output-control required shift position to a normal shift position. The time delay section outputs the estimated torque value to the torque suppressing section upon delaying for a predetermined delay time corresponding to a shifting time when the time delay section is operated by the shift detecting section. Therefore, the suppression of the engine output is executed by the torque suppressing section after the shifting.

8 Claims, 5 Drawing Sheets

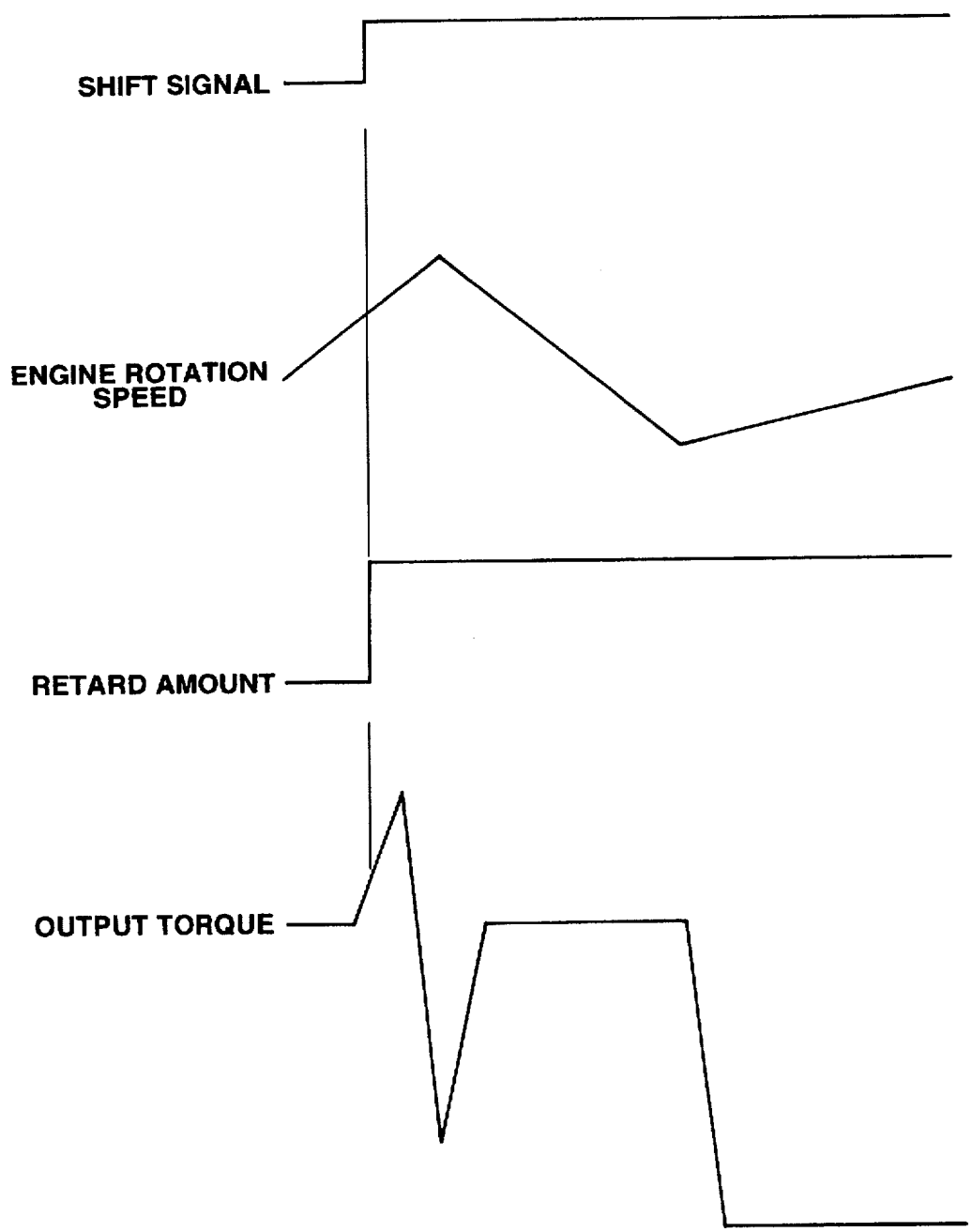

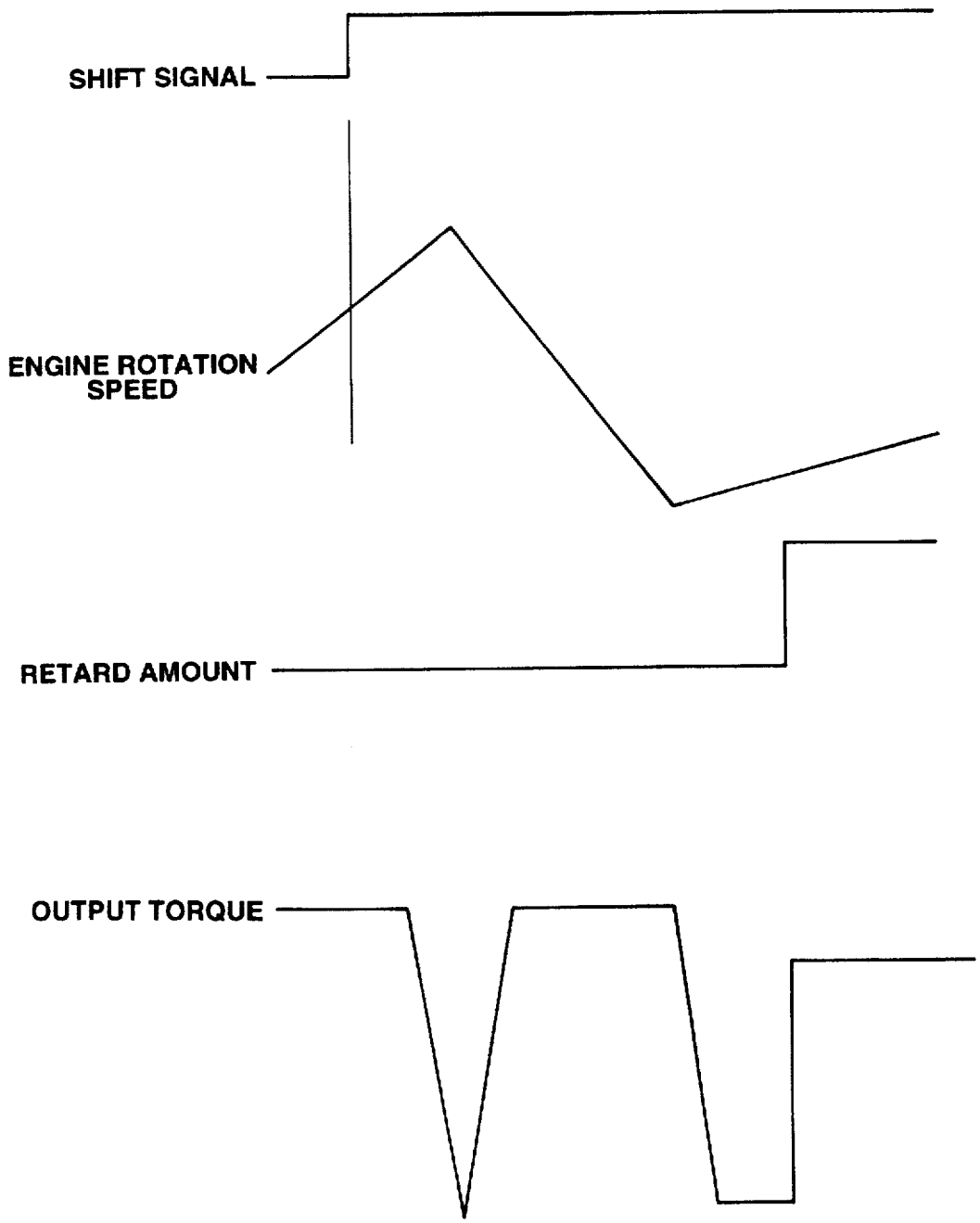

5,720,693

1

ENGINE OUTPUT CONTROL APPARATUS

BACKGROUND OF THE INVENTION

The present invention relates to an output control apparatus for an internal combustion engine.

Japanese Patent Provisional Publication No. 63-189658 discloses a typical output control apparatus for an internal combustion engine with an automatic transmission. This output control apparatus controls the output of the engine so as not to become greater than a maximum transferring power of the automatic transmission.

However, this conventional output control apparatus has a possibility to cause the degradation of a: drive feeling since a radical deviation of the output torque of the engine such as a deviation from small to large torque is overlappedly generated with a shift shock during a shifting of the automatic transmission, particularly during an up-shifting, as shown in FIG. 4. Further, in case that the output control is executed such that the output torque is steppingly returned to a normal output condition as shown in FIG. 5, unexpected radical deviation of the output torque is generated in addition to the degradation of the drive feeling.

SUMMARY OF THE INVENTION

It is an object of the present invention to provide an improved engine output control apparatus which is free from the above-mentioned drawbacks.

An engine output control apparatus according to the present invention is for a vehicle engine connected with an automatic transmission. The engine output control apparatus comprises a limiting section which limits an output of the internal combustion engine so that the output of the internal combustion engine is kept smaller than a maximum power transferring capacity of the automatic transmission. A shift detecting section detects a shifting of the automatic transmission. A forbidding section forbides returning the engine output to a non-limited output by controlling the limiting section when the shift detecting section detects that the automatic transmission is executing a shifting. An allowing section allows returning the engine output to the non-limited output when the shift detecting section detects that the automatic transmission finished a shifting thereof.

With this arrangement, the degradation of the drive feeling due to the duplication between the shift shock during shifting and the deviation of the output torque is avoided. When the predetermined delay time has elapsed, that is, when the shifting is accomplished, the magnitude of the voltage-control signal is gradually increased so that the output of the engine is smoothly increased. Therefore, the engine securely generates a large output torque within a limit of the power transferring ability of the automatic transmission. Accordingly, even if the output power of the engine is greater than the power transferring ability of the automatic transmission, the power greater than the limit of the automatic transmission never inputted to the automatic transmission, and the drive feeling is not degraded even during the shifting.

2

Figure 3:
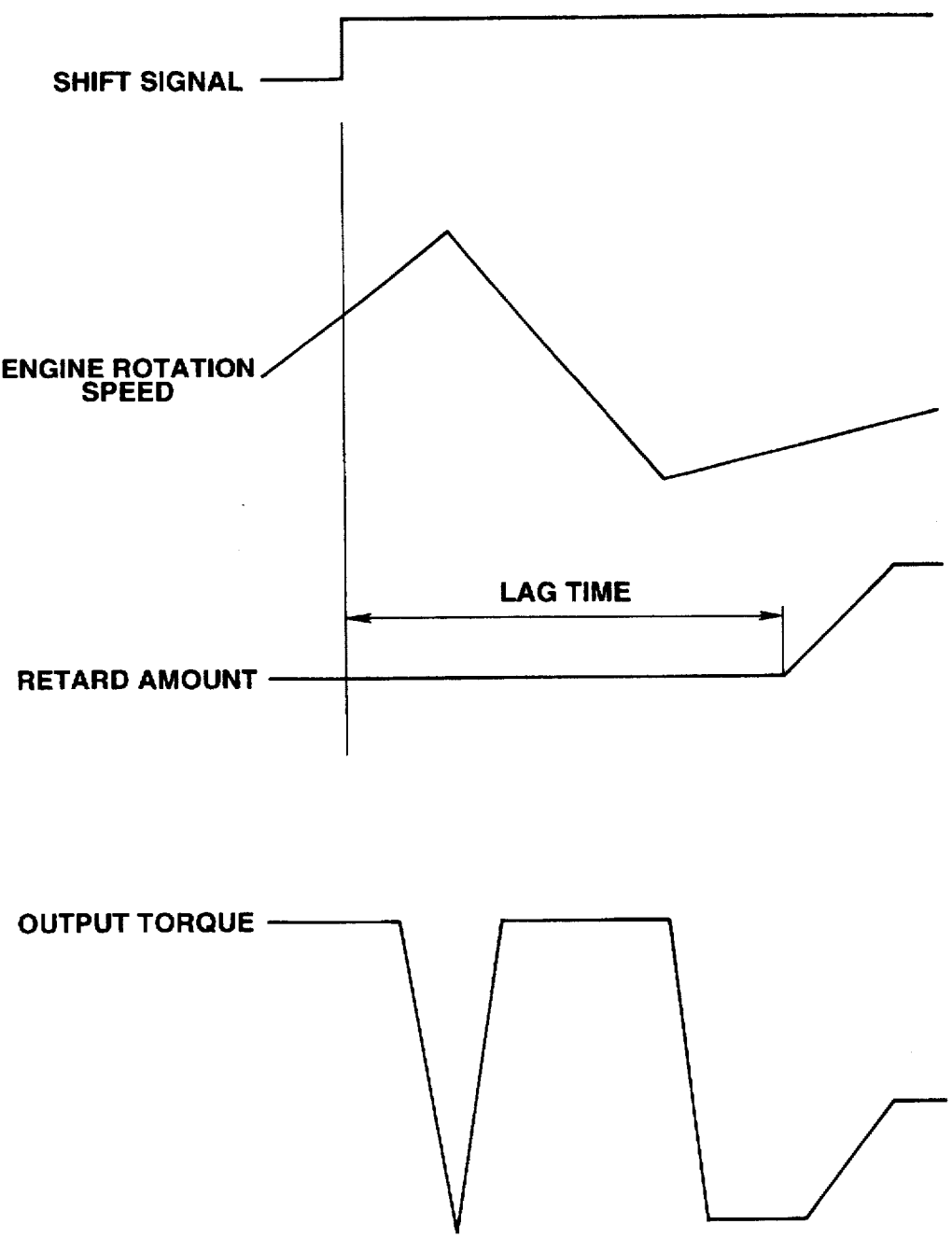

FIG. 3 is a graph which shows changes of an engine rotation speed, an output torque according to the execution of the engine output control in accordance with the present invention; and FIG. 4 is a graph which shows changes of the engine rotation speed and the engine output torque according to the execution of a conventional engine output control; and FIG. 5 is another graph which shows changes of the engine rotation speed and the engine output torque according to the execution of another conventional engine output control.

DETAILED DESCRIPTION OF THE INVENTION

Figure 1:
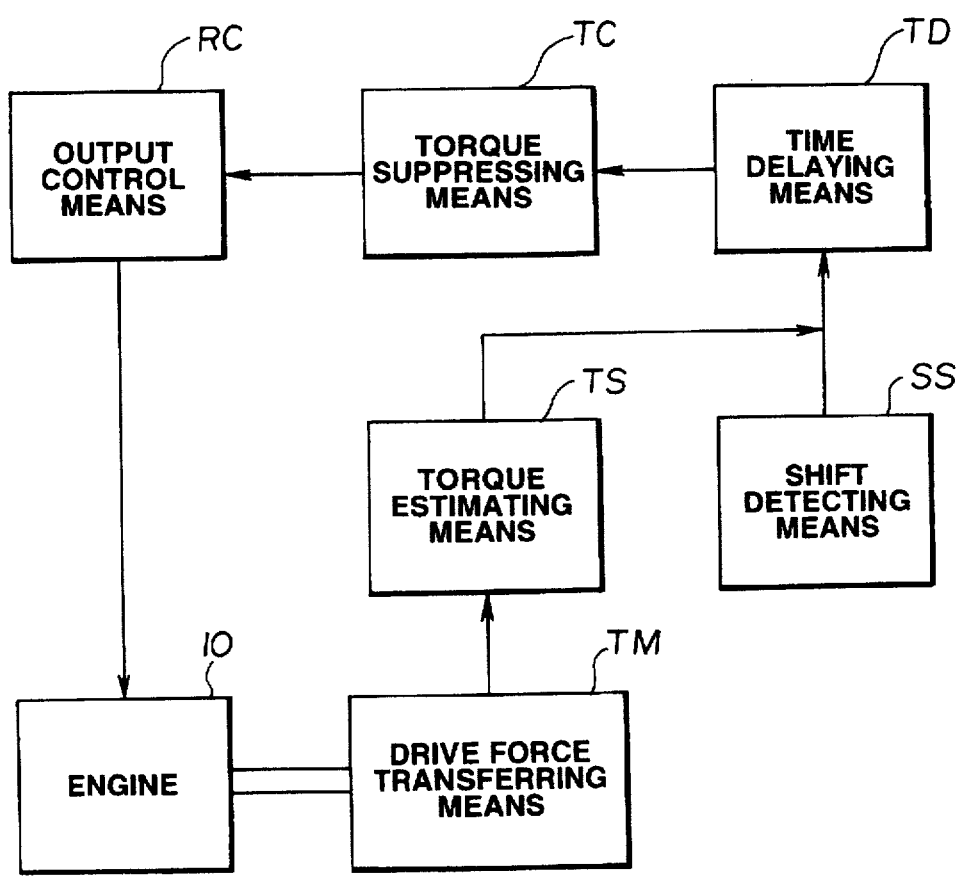
FIG. 1 is a block diagram which shows a basic structure of an engine output control apparatus according to the present invention.
Figure 2:
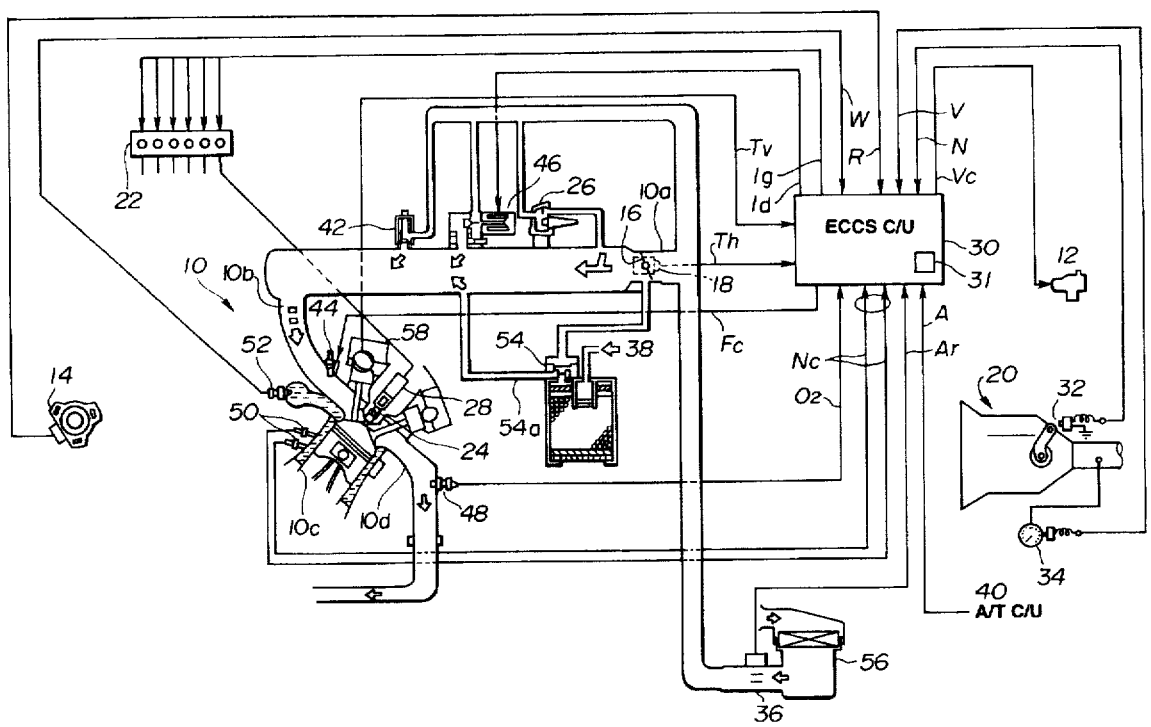
FIG. 2 is a structural view of an engine control system where an embodiment of the engine output control apparatus is applied.

Referring to FIGS. 1 to 3, there is shown an embodiment of an engine output control apparatus according to the present invention.

As shown in FIG. 1, the engine output control apparatus according to the present invention is basically constituted by a drive force transferring means TM, an output control means RC, a torque estimating means TS, a torque suppressing means TC, a shift detecting means SS, and a time delaying means TD. The drive force transferring means TM is interconnected with a crankshaft of an internal combustion engine 10. The output of the engine 10 is controlled into a desired value by the output control means RC. The transferred torque of the drive force transferring means TM is estimated by the torque estimating means TS. The torque suppressing means TC lowers the output of the engine 10 so as to keep the estimated torque within a predetermined range by sending a signal to the output control means RC. The shift detecting means outputs a signal to the time delaying means TD when it detects a shifting from an output-control required shift position to a normal shift position so that a predetermined delay time is set in the time delaying means TD whose delay time is normally set at zero. The time delaying means TD outputs the estimated torque value to the torque suppressing means TC upon delaying for the predetermined delay time when the time delay means TD is operated by the shift detecting device SS. With this arrangement, the suppression of the engine output is executed by the torque suppressing means after the shifting.

As shown in FIG. 2, the internal combustion engine 10 for a vehicle is provided with an intake air passage 10a to which an air cleaner 56 for reducing the amount of dust entering to the intake air passage 10a is connected. An air flow meter 36 is installed downstream of the air cleaner 56 in order to measure air flow rate to be supplied to an intake manifold 10b. The air flow meter 36 is connected to an ECCS control unit (ECCS C/U) 30 and supplies a signal Ar indicative of an intake air amount. Disposed downstream of the air flow meter 36 is a throttle valve 16 by which the flow of air into combustion chambers of the engine 10 is regulated. A throttle sensor 18 is connected to the throttle valve 16 so as to detect an opening degree of the throttle valve 16 and outputs a signal Th indicative of the opening degree of the throttle valve 16 to the ECCS control unit 30. A charcoal canister 54 is arranged to temporally adsorb evaporative emission (fuel vapor) from a fuel tank (not shown) 38 and is connected to the intake air passage 10a through a purging passage 54a for purging the evaporative emission from the charcoal canister 54 to the intake air passage 10a.

The intake air passage 10a is connected to an intake manifold 10b directly connected with an engine block 10c. An air regulator 26, an AAC (Auxiliary Air-amount Control) valve 46 and a FICD (First Idle Control Device) solenoid 42 are installed to the intake passage 10a between the throttle valve 16 and the engine block 10c through bypass passages (no numeral) communicated with an upstream of the throttle valve 16. The AAC valve 46 receives an auxiliary air-amount control signal Id from the ECCS control unit 30, the FICD solenoid 42 receives an air-conditioner signal Ic from an air conditioner controller (not shown), and the air regulator 26 receives a control signal for auxiliary control the air capacity according to the operation of a fuel pump (not shown).

A fuel injector 44 is installed to the intake manifold 10b for each cylinder of the engine 10 and injects a predetermined amount of the fuel according a fuel control signal Fc from the ECCS control unit 30. A fuel pump 12 supplies fuel to the fuel injection 44. A spark plug 24 with an ignition coil 28 is installed to the engine block 10c by each cylinder and is connected to a power transistor unit 22 which receives an ignition timing control signal Ig from the ECCS control unit 30. A water temperature sensor 52 for detecting a temperature of cooling water of the engine 10 is installed to a water jacket of the engine 10. A knock sensor unit 50 is installed to the engine block to detect the onset of detonation in the engine 10. A crankangle sensor 14 for detecting a crankangle of the engine 10 is installed in the engine 10. A variable valve-timing solenoid 58 is disposed in the vicinity of a camshaft of the engine 10 to detect a rotation timing of the camshaft. An $O_2$ sensor 48 for detecting air-fuel ratio of exhaust gases is disposed in an exhaust manifold 10d connected to the engine block 10c.

An automatic transmission 20 is interconnected with the crankshaft of the engine 10. A shift position sensor 32 for detecting the shift position of the automatic transmission 20 and a vehicle speed sensor 34 for detecting a vehicle speed are installed to the automatic transmission 20.

The ECCS control unit 30 receives a rotation signal R from the crankangle sensor 14, a throttle opening degree signal Th from the throttle sensor 18, a shift position signal N from the shift position sensor (shift detection device) 32 of the automatic transmission, a vehicle speed signal V from the vehicle speed sensor 34, an engine Aft total control signal A from the automatic transmission control unit (A/T C/U) 40, an intake air amount signal Ar from the air flow meter 36, two output signals Nc from the knock sensor 50, an output signal $O_2$ from the $O_2$ sensor 48, a water temperature signal W from the water temperature sensor 53, and a timing signal Tv from the variable valve timing solenoid 58.

The ECCS control unit 30 outputs a voltage control signal Vc to the fuel pump 12, an ignition timing control signal Ig to the power transistor unit 22, an idle rotation speed control signal Id to the AAC (air flow amount) valve 46, and a fuel control signal Fc to the fuel injector 44. The ECCS control unit 30 includes the time-delay timer (time delaying means TD) 31, the torque estimating means TS for estimating a torque transferred by a drive power transferring means TM. By controlling either of an ignition timing, a fuel supply amount, an intake air amount, an open-and-close timing of intake and exhaust valves or compressed intake air pressure, the output of the internal combustion engine 10 is controlled. Similarly, the torque control of the internal combustion engine is executed thereby.

Next, the manner of operation of the embodiment of the present invention will be discussed.

The time delay timer 31 is previously set at a predetermined delay time. The magnitude of the delay time is corresponds to a standard (average) time from an output of the shifting command to the end of the shifting. The ECCS control unit 30 receives a rotation signal R from the crankangle sensor 14, the throttle opening degree signal Th from the throttle sensor 18, the shift position signal N from the shift position sensor (shift detection device) 32 of the automatic transmission, the vehicle speed signal V from the vehicle speed sensor 34, the engine Aft total control signal A from an automatic transmission control unit (Aft C/U) 40, the intake air amount signal Ar from an air flow meter 36, the two output signals Nc from the knock sensor 50, an output signal $O_2$ from the $O_2$ sensor 48, the water temperature signal W from the water temperature sensor 53, and the timing signal Tv from the variable valve timing solenoid 58. On the basis of these signals, the ECCS control unit 30 executes calculations of a voltage control signal Vc, an idle rotation speed control signal Id, an ignition timing control signal Ig and a fuel control signal Fc and outputs them to the fuel pump 12, the transistor unit 22, the AAC valve 46 and the fuel injector 44, respectively.

When the ECCS control unit 30 detects a shift command indicative that the automatic transmission (A/T) 20 is shifted from a shift position requiring the output control to a normal shift position through the shift position signal N from the shift position sensor 32, the ECCS control unit 30 sets the time delay timer 31 so as to start and keep the output of the engine 10 in a condition that the output of the engine 10 is set smaller than a normal output condition, by controlling the magnitude of the voltage control signal Vc applied to the fuel pump 12.

With this arrangement, the degradation of the drive feeling due to the overlap between the shift shock during shifting and the deviation of the output torque is avoided. When the predetermined delay time has elapsed, that is, when the shifting is accomplished, the magnitude of the voltage control signal Vc is gradually increased so that the output of the engine 10 is smoothly increased. This enables the engine 10 to generate a large output torque within a limit of the power transferring ability of the automatic transmission 20. Accordingly, even if the output power of the engine 10 is greater than the power transferring ability of the automatic transmission 20, the power greater than the limit of the automatic transmission 20 never inputted to the automatic transmission 20, and the drive feeling is not degraded even during the shifting, as shown in FIG. 3.

Although in the above-mentioned embodiment of the output control of the engine 10 is executed by controlling the fuel supply amount of the fuel pump 12, it will be understood that the output control is not limited to the control of the fuel supply amount and may be executed by the control of the ignition timing, the intake air, the open-and-close timing of the intake and exhaust valves, or supercharged pressure. Further, although the preferred embodiment has been shown and described to forbid the increase of the output of the engine 10 during the shifting, it will be understood that the increase of the engine output may be executed during the shifting if the increased amount is previously determined at a value which does not degrade the drive feeling, and the output of the engine is increased by the previously determined amount during the shifting and after the predetermined delay time elapsed the output is set at a normal output.

What is claimed is:

1. An engine output control apparatus for an internal combustion engine connected with an automatic transmission, said engine output control apparatus comprising:

a limiting means for limiting an output of an internal combustion engine so that the output of the internal combustion engine is kept smaller than a maximum power transferring capacity of the automatic transmission;

a shift detecting means for detecting that the automatic transmission is executing a shifting;

a forbidding means for forbidding returning the engine output to a non-limited output by controlling said limiting means when said shift detecting means detects that the automatic transmission is executing the shifting; and an allowing means for allowing returning the engine output to the non-limited output when said shift detecting means detects that the automatic transmission finished a shifting thereof.

2. An engine output control apparatus for a vehicle engine connected with an automatic transmission, said engine output control apparatus comprising:

a limiting means for limiting an output of an internal combustion engine so that the output of the internal combustion engine is kept smaller than a maximum power transferring capacity of the automatic transmission;

a shift detecting means for detecting that the automatic transmission is executing a shifting; and a control means for controlling a second limited output to a predetermined value between the normal output and the limited output when said shift detecting means detects that the automatic transmission is executing the shifting.

3. An engine output control apparatus as claimed in claim 1, wherein said control means gradually returns the limited output by said limiting means to the normal output when said shift detecting means detects that the automatic transmission finished a shifting thereof.

4. An engine output control apparatus as claimed in claim 1, wherein said limiting means executes the limiting operation of the output of the engine by controlling one of an ignition timing, a fuel supply amount, an intake air amount, and operation of intake and exhaust valves of the engine.

5. An engine output control apparatus as claimed in claim 1, wherein said limiting means, said forbidding means and said allowing means are stored in an engine control unit in the form of a software program.

6. An engine output control apparatus for an internal combustion engine applied to an automotive vehicle, said engine output control apparatus comprising:

a drive force transferring means interconnected with a crankshaft of the internal combustion engine;

an output control means controlling an output of the engine into a desired value;

a torque estimating means estimating a transferred torque of said drive force transferring means;

a torque suppressing means lowering the output of the engine so as to keep the estimated torque within a predetermined range by sending a signal to said output control means;

a shift detecting means outputting a signal when it detects a shifting from an output-control required shift position to a normal shift position; and a time delaying means outputting the estimated torque value to said torque suppressing means upon delaying for a predetermined delay time corresponding to a time period from a start of the shifting to an end of the shifting when it receives the signal from said shift detecting means.

7. An engine output control apparatus as claimed in claim 6, wherein said output control means controls the output of the engine by controlling one of an ignition timing, a fuel supply amount, an intake air amount, and operation of intake and exhaust valves of the engine.

8. An engine output control apparatus as claimed in claim 2, wherein said control means returns the second limited output to the normal output when said shift detecting means detects that the automatic transmission finished the shifting.

* * * * *